Patented Mar. 15, 1949

2,464,263

UNITED STATES PATENT OFFICE 2,464,263

MOLDING COMPOSITION COMPRISING A POLYVINYL RESIN AND A CRACKED PETROLEUM RESIDUUM

Kenneth H. Rudd, Cleveland Heights, Ohio, assignor to The Standard Oil Company, Cleveland, Ohio, a corporation of Ohio No Drawing. Application May 17, 1945, Serial No. 594,375

8 Claims. (Cl. 260—28.5)

This invention relates to a novel homogeneous composition of matter comprising a polyvinyl resin and a particular asphaltic-like material as the principal plastic ingredients.

This is a continuation-in-part of my application Serial Number 534,535, filed May 6, 1944 now abandoned.

Vinyl chloride polymers are well known in the art. In general they are very tough and rigid and are usually prasticized. They can be internally plasticized by copolymerizing certain other unsaturated monomers therewith.

Vinyl chloride-acetate copolymers are one of the most popular copolymers. They are made by copolymerizing vinyl chloride and vinyl acetate. The vinyl chloride imparts the toughness and strength and the vinyl acetate imparts certain solubility properties. The proportion varies, depending on the properties wanted in the copolymer, but in general, about 8 to 9.5 mols of vinyl chloride is copolymerized with 2 to 0.5 mols of vinyl acetate. A preferred ratio is in the neighborhood of 9 mols of the chloride to 1 mol of the acetate. These copolymers are well known in the art. They are known in trade merely as "copolymer resins" and will be referred to as such. Copolymer resins suitable for use in practicing the invention are available under the trade names "Vinylite" VYHH, VYNS, VYLF, VYNW, and VYNV, which I am advised are vinyl chloride-acetate copolymers of the type described above. Any other similar vinyl chloride-acetate copolymer can be used in practicing the invention. They are available in many forms, including solids in a pulverized condition.

Another copolymer is 8 to 9.5 mols of vinyl chloride copolymerized with 2 to 0.5 mols of vinylidene chloride.

My invention is applicable to polyvinyl chloride per se or vinyl chloride copolymerized with less than 50% of a modifying monomer, preferably less than 25%. I may use polyvinyl chloride per se, externally plasticized, or internally plasticized by copolymerizing with another monomer but in which the vinyl chloride comprises the major portion of the resin, and in which the properties of the resin are primarily the characteristics imparted by polyvinyl chloride.

My invention is especially adapted for use in connection with the "copolymer resins" and will be described hereinafter as applied to them merely for illustrative purposes.

These polyvinyl resins, especially the copolymer resins, have many unique properties which adapt them for uses to which many other plastics are not suitable. They are also unique in that they do not blend readily with materials, such as oils, fats, waxes, gums, and these materials are referred to as being "incompatible." As stated by one leading manufacturer: "This means that, by and large, these resins cannot be used to fortify other types of finishes to improve their properties, but must be handled by themselves according to their own special technology."

The polyvinyl resins are also much more expensive than many other types of molding plastics. While their higher price justifies their use for many special purposes to which their unique properties adapt them, they are not competitive with many other plastics which cost about half as much. Their incompatibility, as described above, has rendered it difficult to compound them so as to reduce the cost of the compounded composition.

I have conceived that if a very low cost material could be found which was fully compatible with the polyvinyl resins and which could be blended in a relatively large amount, the resulting composition would be competitive with the more inexpensive plastics.

One such material which suggested itself to me was asphalt. However, I found that ordinary asphalt is not compatible in an amount of more than 15%. Investigation showed that the incompatibility of the copolymer resins with asphalt in a large amount was recognized in the literature.

Contrary to what might have been expected from these known characteristics of polyvinyl resins and asphalt, I discovered that a particular type of asphaltic-like material is compatible with polyvinyl resins, and that the mixture possesses a maximum of the desirable properties of the polyvinyl resins and a minimum of the undesirable properties of the asphaltic-like material. This blending of polyvinyl resins with the asphaltic-like material may be viewed as upgrading the asphaltic-like material to an extend that the blended material exhibits excellent qualities as a composition for molding including extrusion and injection molding.

The two ingredients can be used in substantially all proportions. Any amount of the asphaltic-like material can be added to the resin, but generally the amount will be at least 25% (by weight) based on the total composition, since amounts this high produce compositions retaining to a surprising degree the desirable properties of the polyvinyl resin and also result in the desired economies. When even a few per cent, such as 5% of the resin is added to the asphaltic-like material, its properties as a molding plastic are improved to an extent entirely out of proportion to the amount of the polymer resin. While considerations of operability do not impose any limitations on the proportions, practical considerations suggest that the economic range will be 25 to 95% of the asphaltic-like material to 75 to 5% of the polymer.

The asphaltic-like material used in accordance with the invention must have a specified composition to be suitable. Asphalt is a term used to define a wide variety of substances of different compositions from a wide variety of sources. Even as applied to material of petroleum origin, it varies with the method of processing the crude. I deem it necessary to explain in some detail just what comprises the asphaltic-like material I may use in the composition of my invention and how it may be made.

Asphalt, tars, and similar materials are difficult to define in terms of their chemical composition and their components are often difficult to identify. For this reason I prefer to define the asphaltic-like material used in my invention in terms of the process for making the same.

Crude petroleum, such as an asphalt or mixed base crude, is generally distilled to remove the components that are more readily volatile at atmospheric pressure, including naphthas, such as gasoline, kerosene, and higher fractions. The portion of the crude remaining after such distillation is referred to as a "reduced crude." It is common to fractionate the reduced crude at a high temperature (500 to 800° F.) at a high vacuum (10 to 45 mm. Hg absolute). A plurality of distillate fractions are obtained. They may be, for example: "gas oils" which are often used as cracking stocks; "paraffin distillate," which contains lubricating oil base and wax, and from which good lubricating oil can be made by removing the wax; "wax slops," also used as a cracking stock; and "cylinder stock," from which lubricating oil bases and ingredients can be derived.

The material that remains unvaporized, even under the high temperature and low pressure, is properly referred to as "vacuum pipe still bottoms." It is also sometimes referred to as a type of asphalt. This material contains non-volatile components of the crude and is high in "asphaltenes." There are substantially no products in the pipe still bottoms which result from cracking.

When the pipe still bottoms are "oxidized," such as by blowing with air, a condensation or polymerization takes place and the product becomes harder and is more correctly referred to in the trade as "asphalt." The bottoms may also be hardened and further reduced by blowing with steam. It is this type of material which is not compatible with the resin to any great extent.

The asphaltic-like material used in my composition is a residuum from the thermal cracking of a petroleum fraction. Generally it is obtained by one of a variety of processes for thermally cracking petroleum distillate and other fractions. (Thermal cracking is to be distinguished from catalytic cracking since the latter does not form an asphaltic-like residuum).

As illustrative, a gas oil is subjected to high temperatures and pressures in accordance with a conventional residuum cracking process. Cracked products are obtained which are more volatile, such as gasoline. A heavy residue is obtained which is known as "cracking coil tar" or "cracked residuum." It is this residue which is illustrative of the asphaltic-like materials which can be used in my composition or from which my asphaltic-like material may be made. It is desirable to remove as much of the volatile products from the residuum as possible. To this end it may be heated to about 700° F. under pressure and flashed in a vacuum still where the more volatile components are vaporized and removed. The residue is referred to as "reduced" and will have, for example, a penetration of 50–60 (at 77° F. 100 g. 5 sec. ASTM penetration test) and a softening point of 115–120° F. (ball and ring ASTM test). This can be blown, if desired, to raise the softening point up to as high as 300° F. and a penetration down to zero.

The extent to which the volatile components are removed from the residuum from the thermal cracking and the extent to which the penetration is raised by blowing, does not materially affect the compatibility of my asphaltic-like material, but it does affect the temperature to which the blend can be subjected before softening.

It is to be noted that the asphaltic-like material used in my invention can be made only from volatile or distilled components of the crude. This shows that it is to be distinguished from the non-volatile components of the crude which remain in the pipe still bottoms.

The cracking processes that may be used for making the asphaltic-like material are known as residuum cracking processes, as distinguished from cracking processes which are operated under conditions to produce only coke as a residue. The temperature, time of cracking and pressure are interrelated to produce a heavy residuum as is well known in the art. In liquid phase cracking, the temperatures are about 800 to 1100° F., with pressures of 500 to 1500 pounds per square inch or even higher. In vapor phase cracking higher temperatures and lower pressures are used for a shorter time. Whether the hydrocarbon is in the liquid or vapor phase, or a part in each, depends also on the boiling point and range of the cracking stock.

The process should be operated so as to produce a cracked residuum that has a major portion of its components resulting from the cracking of other hydrocarbons. When a light gas oil is used as the charging stock for the cracking, all of the heavy residuum results from the cracking of the lighter components of the gas oil. If the charging stock is a whole crude or a reduced crude, a portion of the components of the charging stock may go through the cracking process unaffected if the temperature and pressure conditions are not sufficiently severe, and thus accumulate in the residuum. These must be in a minor proportion in a residuum suitable for use in my invention. In the case of gas oils and light fractions, the cracking can be less severe. When a heavier fraction is cracked, the cracking conditions must be more severe in order that a major portion of the components in the residuum may be formed as the result of cracking.

Generally the cracking process is regulated to produce the type and amount of gasoline wanted and is not regulated to produce asphaltic-like material of any specified character. In view of the above explanation, one skilled in the art will be able to ascertain if the cracking process is one which will produce a residuum suitable for use in my invention.

The composition of my invention can include a plasticizer, which increases the flexibility, impact strength, and permits the material to be worked at lower temperatures. Any plasticizer may be used which is compatible with copolymer resins; the nature of these is well understood in the art. Particularly satisfactory plasticizers are those of the ester type, such as di-octyl phthalate, di-butyl phthalate, di-butyl sebacate, tri-cresyl phosphate, methyl abietate, triphenyl phosphate and similar esters. Chlorinated esters, aromatic ethers and ketones also may be employed, as is well understood. The amount of the plasticizer used is that required to obtain the necessary plasticity and may vary within the extremes of 0 to 30%; the preferred range being about 1 to 8%.

The composition of the invention can also be used with an inert filler which may vary in proportions, depending upon the particular article to be molded. In general, this may vary from about 0 to 60%. Any inert filler may be used, as is well understood in the plastic molding art, such fillers including, for instance, calcium silicate, talc, slate dust, magnesia, carbon black, precipitated carbon, air blown chalk, fly ash, mineral flour, lignin, wood flour, clay, asbestos, cotton fiber or other organic or mineral fibrous material. Other auxiliary agents may be used, such as calcium stearate and zinc stearate.

The composition may be compounded by thoroughly milling or mixing the ingredients together in the desired proportions. The composition is then ready for use in any of the standard molding, film-forming, or coating techniques.

The following examples are given merely as illustrative:

*Example I*

A mixture is made up of the following ingredients:
33.8% of the residuum formed by reducing cracking coil tar, and having a penetration of 60 to 70, 23.4% of a commercial polyvinyl-chloride-acetate copolymer resin "Vinylite VYHH," 19.5% carbon black, 19.4% calcium silicate, and 3.9% di-butyl phthalate were milled together. The resulting composition was molded and had satisfactory properties for use as panel boards, molded fittings, dials, etc.

*Example II*

Reduced cracking coil tar is oxidized by blowing air through it until it attains a softening point of 182° F. It is blended with a polyvinyl chloride-acetate copolymer resin "Vinylite VYNV" in the proportions of 44.5% of the asphaltic-like material and 54.5% of the copolymer resin. The resultant composition was found to be very hard and had a tendency toward brittleness. It was found that the addition of about 1% of di-octyl phthalate as a plasticizer greatly reduced this tendency toward brittleness, and increased the toughness and tensile strength of the molded product without lowering the distortion temperature.

The plasticized product was tested for impact, flexure, tensile strength, and distortion temperature.

In the impact test, a disc of the plastic 2" in diameter and 3/8" thick is supported on the flat surface and a pin having a spherical end 1 cm. in diameter is placed in the center of the disc. A 2 kg. weight is raised in increments of 10 cms. and dropped on the pin. This plastic required 6 drops of the weight, the last one from the height of 60 cm., to break the disc.

The flexure test is similar to the standard A. S. T. M. test, in which a rod 1/2" square and 5" long is supported 1/2" from each end, and the load applied in the center of the rod at 77° F. at a rate of 1.8 inches per minute. The rod of this plastic broke at 10,850 pounds per square inch.

The tensile strength is a standard test and was measured on a rod of the plastic 5" long and 1" square in the middle of which has been milled a section 1/4" in diameter and 1" long, and a force of 3,200 pounds per square inch was required to break the rod.

The distortion temperature is a standard A. S. T. M. test in which a bar 1/2" square is supported near its ends and a weight placed in the center. The temperature is raised at a regulated rate and the temperature at which the bar bends is the distortion temperature. This plastic had a distortion temperature of 140° F. which is entirely acceptable for plastics of this type.

*Example III*

An oxidized cracking coil tar having a softening point of 182° F., such as that used in Example II, is blended with a polyvinyl-chloride-acetate copolymer resin "Vinylite VYNS" in equal proportions of the resin and the asphaltic-like material. The composition does not include any plasticizer or other material. The resulting composition had a distortion temperature of 140° F. This relatively higher distortion temperature may be attributed in part to the absence of a plasticizer.

*Example IV*

A composition was made comprising 49.5 parts of a commercial polyvinyl-chloride-acetate copolymer resin "Vinylite VYNS," 33.1% of a highly cracked asphaltic-like residuum having a penetration of 52, 5% of dibutyl phthalate, and 12.4 parts of wood fiber. The resulting composition resisted an impact of 100+ cm. It had a tensile strength of 2,510 pounds per square inch, a flexure of 10,280 pounds per square inch and a distortion temperature of 102° F. The relatively lower distortion temperature may be attributed in part to an asphaltic-like material of relatively lower softening point or higher penetration and the presence of a relatively large amount of plasticizer.

It will be apparent from the above examples that the exact properties wanted in the plastic can be obtained by varying the proportions of the various ingredients and by selecting those having characteristics which contribute to the properties wanted in the composition. It will also be apparent that my invention includes a variety of ingredients within the limitations specified heretofore, and that they may be compounded and processed in a variety of ways. All such variations are intended to be included within the invention as fall within the scope of the following claims.

I claim:

1. A molding composition comprising a polyvinyl resin selected from the group consisting of (1) polyvinyl chloride resins and (2) polyvinyl chloride-acetate copolymer resins in which the chloride is in the major proportion, and a cracked residuum comprising a major portion of components resulting from the thermal cracking of a petroleum distillate fraction.

2. A molding composition comprising a polyvinyl chloride-acetate copolymer resin in which the chloride is in the major proportion and a cracked residuum comprising a major portion of components resulting from the thermal cracking of a petroleum distillate fraction, said cracked residuum in the composition being in an amount of more than 25%.

3. A molding composition comprising a polyvinyl resin selected from the group consisting of (1) polyvinyl chloride resins and (2) polyvinyl chloride-acetate copolymer resins in which the chloride is in the major proportion, and a cracked residuum resulting from the thermal cracking of a petroleum distillate in the naphtha-gas oil boiling range.

4. A molding composition comprising a polyvinyl chloride-acetate copolymer resin in which the chloride is in the major proportion and a cracked residuum resulting from the thermal cracking of a petroleum distillate in the naphtha-gas oil boiling range, said cracked residuum in the composition being in an amount of more than 25%.

5. A molding composition comprising a polyvinyl-chloride-acetate copolymer resin in which the chloride is in the major proportion, a cracked residuum comprising a major portion of components resulting from the thermal cracking of a petroleum distillate fraction, and a plasticizer compatible with the resin.

6. A molding composition comprising a polyvinyl-chloride-acetate copolymer resin in which the chloride is in the major proportion, a cracked residuum resulting from the thermal cracking of a petroleum distillate in the naphtha-gas oil boiling range, and an ester plasticizer compatible with the resin, said plasticizer being in an amount, less than 30%, to plasticize the composition.

7. A molding composition comprising a polyvinyl resin selected from the group consisting of (1) polyvinyl chloride resins and (2) polyvinyl chloride-acetate copolymer resins in which the chloride is in the major proportion, a cracked residuum comprising a major portion of components resulting from the thermal cracking of a petroleum distillate fraction, and a plasticizer compatible with the resin, said plasticizer being in an amount, less than 30%, to plasticize the composition.

8. A molding composition comprising a polyvinyl-chloride-acetate copolymer resin in which the chloride is in the major proportion, a cracked residuum resulting from the thermal cracking of a petroleum distillate in the naphtha-gas oil boiling range, said cracked residuum being in an amount of more than 25%, and an ester plasticizer compatible with the resin, said plasticizer being in an amount, less than 30%, to plasticize the composition.

KENNETH H. RUDD.

REFERENCES CITED

The following references are of record in the file of this patent:

UNITED STATES PATENTS

| Number | Name | Date |
|---|---|---|
| 2,115,896 | Wiezewich | May 3, 1938 |

OTHER REFERENCES

"Vinylite Co-polymer Resins for Surface Coating," published by Carbide and Carbon Chemical Corporation, New York, New York, 1942, page 36. (Copy in Division 50.)